No. 12,056. Reissued Nov. 18, 1902.

O. P. & R. H. YURGAE.

COMBINED ELECTRIC SIGNAL AND TELEPHONE SYSTEM.

(Application filed July 26, 1902.)

3 Sheets—Sheet 1.

Witnesses:
Geo. W. Young
N. E. Oliphant

Inventors:
Otto P. Yurgae
Robert H. Yurgae
By H. G. Underwood
Attorney

No. 12,056. Reissued Nov. 18. 1902.

O. P. & R. H. YURGAE.

COMBINED ELECTRIC SIGNAL AND TELEPHONE SYSTEM.

(Application filed July 26, 1902.)

3 Sheets—Sheet 2.

Witnesses:
Geo. W. Young.
N. E. Oliphant

Inventors:
Otto P. Yurgae
Robert H. Yurgae
By H. G. Underwood
Attorney

No. 12,056. Reissued Nov. 18, 1902.

O. P. & R. H. YURGAE.

COMBINED ELECTRIC SIGNAL AND TELEPHONE SYSTEM.

(Application filed July 26, 1902.)

3 Sheets—Sheet 3.

Witnesses:
Geo. W. Young.
N. E. Oliphant

Inventors:
Otto P. Yurgae
Robert H. Yurgae
By H. G. Underwood
Attorney

UNITED STATES PATENT OFFICE.

OTTO P. YURGAE AND ROBERT H. YURGAE, OF MILWAUKEE, WISCONSIN, ASSIGNORS, BY MESNE ASSIGNMENTS, TO THE SIGNALPHONE COMPANY, OF MILWAUKEE, WISCONSIN, A CORPORATION OF WISCONSIN.

COMBINED ELECTRIC SIGNAL AND TELEPHONE SYSTEM.

SPECIFICATION forming part of Reissued Letters Patent No. 12,056, dated November 18, 1902.

Original No. 655,144, dated July 31, 1900. Application for reissue filed July 26, 1902. Serial No. 117,672.

*To all whom it may concern:*

Be it known that we, OTTO P. YURGAE and ROBERT H. YURGAE, citizens of the United States, and residents of Milwaukee, in the county of Milwaukee and State of Wisconsin, have invented certain new and useful Improvements in a Combined Electric Signal and Telephone System; and we do hereby declare that the following is a full, clear, and exact description thereof.

Our invention has for its object to economically combine electric-signal systems with means for electric-telephone communication between call and main stations of such systems and to provide for the indication of the signals at a main station of such a system without interference with the talking-circuit established between said main station and a call-station, said invention consisting in what is hereinafter particularly set forth with reference to the accompanying drawings and subsequently claimed.

Figure 2:
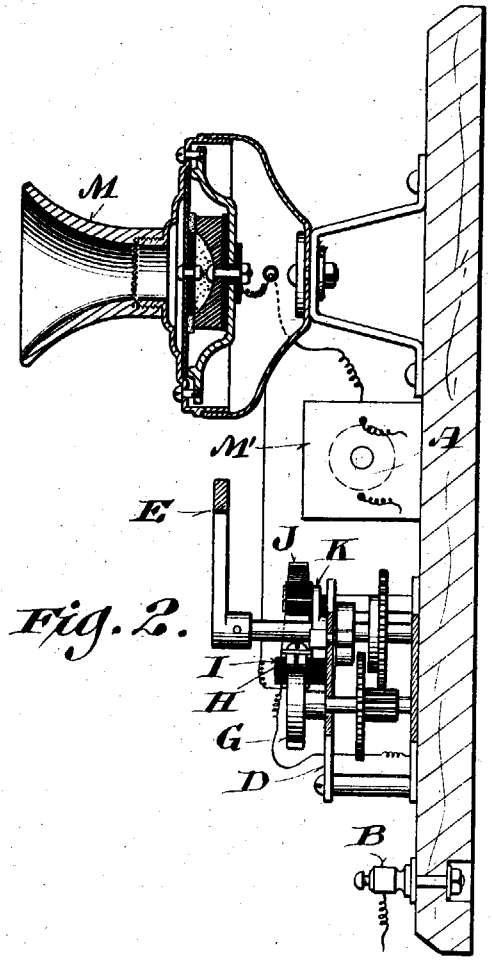
Figure 1:
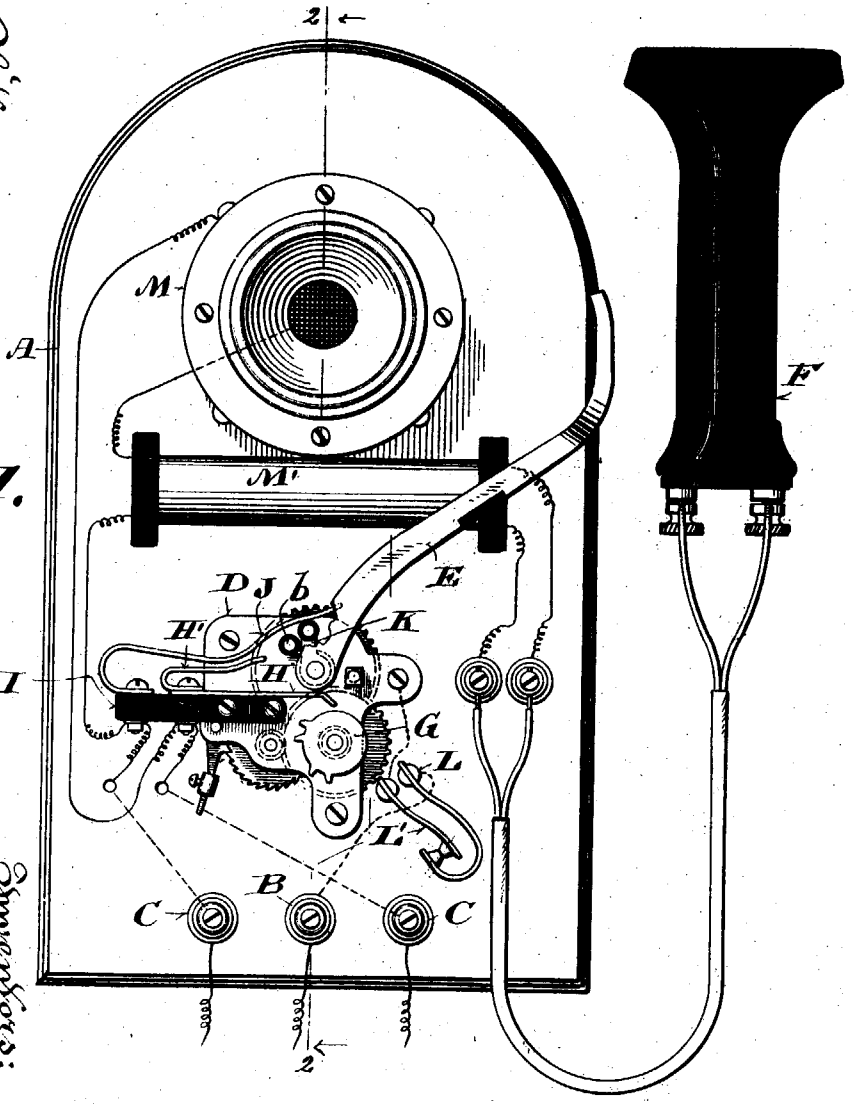
Figure 3:
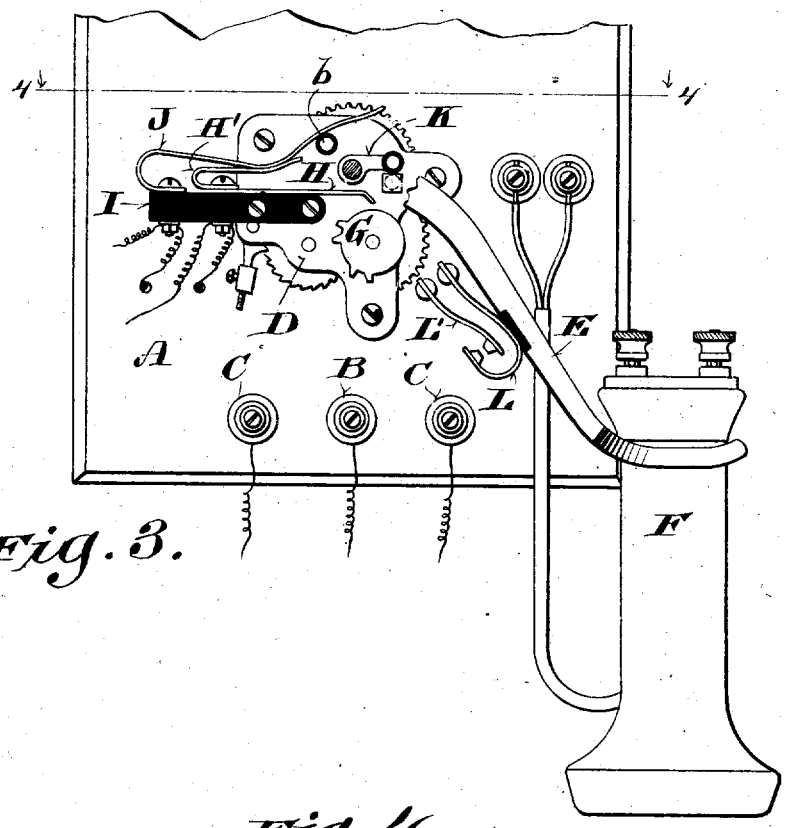
Figure 4:
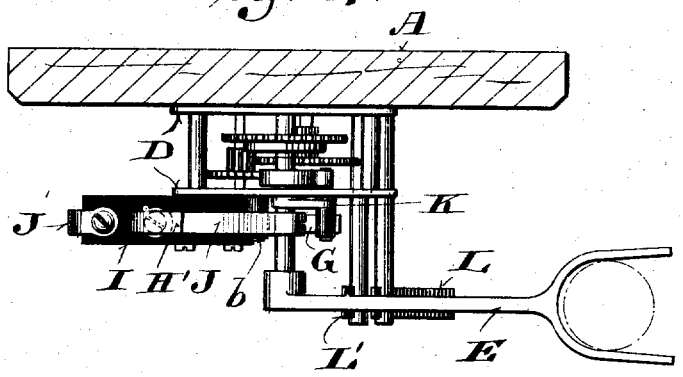

Figure 1 of the drawings represents a front elevation of combined signal and telephone apparatus embodied in a call-station instrument that constitutes part of our invention, the telephone-receiver being off hook; Fig. 2, a sectional view indicated by line 2 2 in the preceding figure; Fig. 3, a front elevation of a portion of the aforesaid apparatus, partly broken, said telephone-receiver being hung on the main-shaft crank of a spring-motor, such as is commonly employed in messenger-call boxes of district-telegraph companies; Fig. 4, a plan view, partly in horizontal section, on the plane indicated by line 4 4 in the third figure of the series; and Fig. 5, a diagram illustrating the practical working of our invention.

Referring by letter to the drawings, A indicates the back of an instrument such as we propose to employ at each call-station of a combined electric signal and telephone system in accordance with our invention, and in practice a removable housing will be utilized to cover mechanism mounted on said back, the latter being provided with a ground-wire binding-post B and other binding-posts C C for a line-wire with which the several call-station instruments are connected. Mounted on back A is the frame D of a spring-motor, to which reference is had in the description of Fig. 3, and in accordance with our invention main-shaft crank E of this well-known type of motor is made to serve as a hanger for an electric-telephone receiver F, that in accordance with our invention constitutes part of the apparatus at each call-station on the line. When the receiver F is hung on motor-crank E, the latter is swung down to contract the motor-spring; but if said receiver be detached from said arm expansion of said spring takes place to drive the motor-gear, and thereby rotate the number-wheel G, fast on a counter-shaft of the gear-train, throw of the aforesaid arm in either direction being limited by any suitable means. When the number-wheel has rotation, its teeth contact with an opposing spring-metal plate H, constituting a conductor supported on insulation I, attached to the motor-frame. Another spring-metal plate or conductor H′ is shown surmounting the one H, for the most part parallel thereto; but in practice it may be a recurved continuation of same, these conductors being electrically connected with one of the line-wire binding-posts C of the instrument. Supported on insulation I and electrically connected with the other of the line-wire binding-posts C of the instrument is a spring-conductor J, that contacts with conductor H′ and rests on a stud *b* of the motor-frame when crank E is depressed to full limit, said stud being surrounded with insulation to insure against partial grounding of the line-wires through said motor-frame while said crank is in its depressed position. Fast on the main shaft of the motor we show a lifter K for the conductor J; but it is practical to have this lifter on the aforesaid crank, its function being to break connection of the opposing conductors when said crank has upward throw incidental to removal therefrom of the telephone-receiver, for which it constitutes a hanger.

That portion of lifter K that abuts conductor J is surrounded by insulation to insure against partial grounding of the line-wires through the motor, while spring-contacts L L′, hereinafter more particularly set forth, remain in touch after upward throw of the crank aforesaid.

Figure 5:
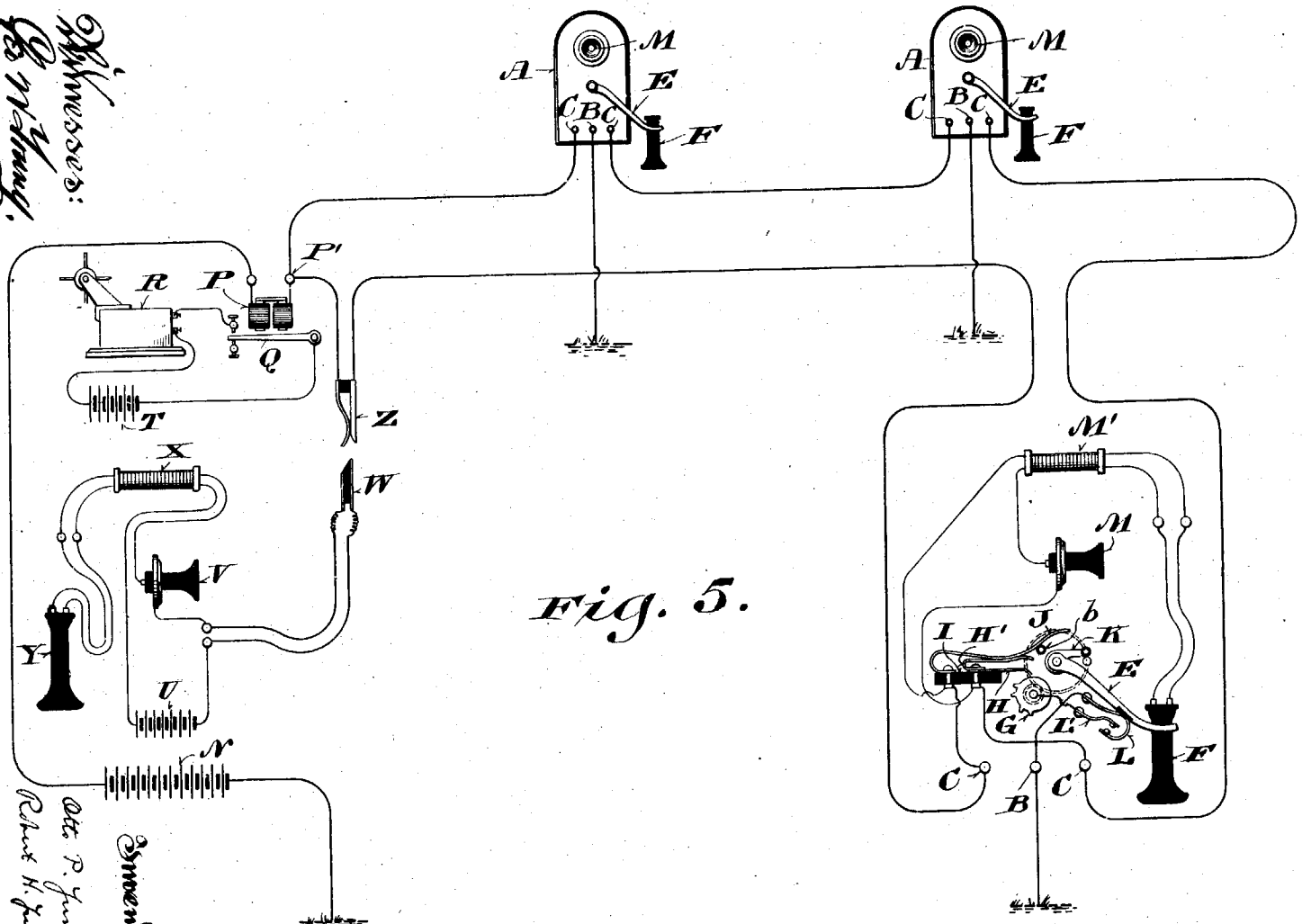

In post connection with the instrument back A we show the spring-contacts L L′, one of which is wired to binding-post B and the other to the motor-frame, whereby when these contacts are in touch the number-wheel G is grounded. The motor-crank E being swung down by weight of telephone-receiver thereon, it bears against contact L to separate same from contact L′, and thus the ground is taken off the number-wheel, said crank in the present showing being made a non-conductor by insulation opposed to contact L, as shown in Figs. 1, 3, and 5; but it is apparent that grounding of said wheel takes place the instant said crank-arm is permitted to ascend. While we have provided means for taking the ground off the number-wheel when the call-station telephone-receiver is hung up, it is practical to have the ground constant on said wheel. An electric-telephone transmitter M and an induction-coil M′ are included in the call-station instrument, the conductors H and J being put in circuit with said transmitter and primary of the coil, the secondary of said coil being put in circuit with the telephone-receiver F aforesaid. One terminal of a battery N at main station of the line is grounded and the other terminal of the battery is wired to the electromagnet P of a relay, from which said line goes out through a post P′, through the several call-station instruments, and returns to said post, thus forming a metallic talking-circuit, the armature Q of the relay, a register R, and a battery T being in local circuit. An electric telephone apparatus at main station is in circuit with a battery U, having sufficient strength to overcome resistance of the line-circuit, the terminals of this battery, the transmitter V of the telephone apparatus, and opposite conductor-plates of a split plug W being in circuit with the primary of the induction-coil X of said telephone apparatus, the receiver Y of this apparatus being put in circuit with the secondary of said coil.

In connection with the line at main station is a spring-jack Z for engagement of the split plug W when it is desirable to connect the telephone at said station with said line.

To signal main station from any call-station on the line, telephone-receiver F at the call-station is removed from its hanger, and incidental to automatic ascent of this hanger the then rotating number-wheel is grounded, whereby it is apparent that the number of the call-station will be automatically indicated at said main station, owing to intermittent contact of the teeth of said wheel with conductor H, whose practical continuation H′ is for the time being in contact with conductor J of the circuit. When a call comes in, the main-station operator connects split plug W with spring-jack Z to utilize current from battery U and complete a metallic talking-circuit with the call-station, the lifter K at said call-station having operated in the meantime to lift conductor J, so that the telephone apparatus of this station may be effective. The caller can now converse with the main-station operator to impart or receive instruction or information, and the conversation being finished receiver F of calling-station telephone is again hung on the motor-crank to thereby effect an automatic cutting out of said telephone and the taking away of ground from the number-wheel of the signal-circuit.

From the foregoing it will be understood that all current necessary for the signaling and talking circuits is furnished directly from main station of the line, and under ordinary circumstances none of the call-stations on said line can have telephone communication with the main station without first indicating the call-station number, nor does establishing of the talking-circuit between one call-station and main station interfere with sending in of signal from any others of the call-stations on the line, and should it happen that while one caller has the line other callers cut in the operator at main station will take the messages in order of registration of the calls if a register be employed, as herein shown, to indicate said calls. Should the line furnishing current for talking-circuit become broken, short-circuited, or otherwise inoperative, there will be no interference with the signaling of a call-station to main station, as either the out or in of the line and the ground will constitute a signal-circuit. In case the signal-circuit becomes improperly grounded, so as to prevent indication of a call, and the talking-circuit remain unimpaired communication between call and main stations may be had on the latter circuit, provided main-station operator becomes aware of the trouble and connects main-station telephone with the line.

It is obvious that one main-station telephone apparatus may serve for connection with the talking-circuit of any of several independent call-station lines, each of the latter being provided with its own spring-jack for engagement of the split plug constituting part of said apparatus.

Having thus described our invention, what we claim as new, and desire to secure by Letters Patent, is—

1. The combination of a main-station battery and electric-signal register, call-station instruments on a line having electrical connection with said battery and register, each instrument comprising a number-wheel, a spring-motor for same, separable conductors intercepting the line and arranged to have one thereof in yielding opposition to teeth of said wheel, a crank on a motor-shaft movable in one direction to contract the motor-spring, a device movable with the crank to separate said conductors coincident with expansion of said spring, and electric-telephone apparatus in connection with the aforesaid conductors, the motor-crank serving as a hanger for the receiver element of this apparatus; means for ground-circuiting the number-wheel with the aforesaid battery, a main-station electric-telephone apparatus, a battery for same, and means for putting this telephone apparatus and battery in and out of circuit with the line of call-stations.

2. The combination of a grounded main-station battery and electric-signal register, call-station instruments on a line having electrical connection with said battery and register, each instrument comprising a number-wheel, a spring-motor for same, separable conductors intercepting the line and arranged to have one thereof in yielding opposition to teeth of said wheel, a crank on a motor-shaft movable in one direction to contract the motor-spring, a device movable with the crank to separate said conductors coincident with expansion of said spring, electric-telephone apparatus in connection with the aforesaid conductors, the motor-crank serving as a hanger for the receiver element of this apparatus, and separable contacts respectively in electric connection with the ground and aforesaid number-wheel, their arrangement being such that separation takes place incidental to descent of said crank; a main-station electric-telephone apparatus, a battery for same, and means for putting this telephone apparatus and battery in and out of circuit with the line of call-stations.

3. The combination of electric telephones in series on a metallic circuit, signaling mechanism associated with each telephone and operatively connected to said circuit, a ground-wire for each signaling mechanism, a main-station talking-battery and electric telephone operative on the metallic circuit, and a main-station signal-battery and signal-indicating instrument electrically connected to said metallic circuit and the ground, whereby conversation may be carried on and signals transmitted at the same time without interference.

4. The combination of electric telephones in series on a metallic circuit, a call-box associated with each telephone and operatively connected to said circuit, a ground-wire for each call-box, a main-station talking-battery and electric telephone, means for detachable electric connection of this battery and telephone with the metallic circuit, and a signal-receiving battery and signal-indicating instrument in permanent electrical connection with said metallic circuit and the ground, whereby conversation may be carried on and signals transmitted at the same time without interference.

5. The combination of electric telephones in series on a metallic circuit, means whereby each telephone is shunted out of circuit when its receiver is hung on hook, corresponding electric signaling mechanisms connected on one side with the metallic circuit and on the other side with the ground but normally in open circuit, means whereby each signal mechanism is grounded and automatically actuated simultaneously with the removal of a corresponding telephone-receiver from its hook, a main-station battery and signal-indicating instrument having electric connection with the metallic circuit and ground, a main-station electric telephone and talking-battery, and means for putting the aforesaid line in closed circuit with the latter telephone and battery.

6. The combination of a main-station battery having one terminal thereof grounded, a relay having one side of the electromagnet thereof in connection with the other terminal of said battery, a main-station electric-signal-indicating instrument and local battery in normally open circuit connection with the relay-armature, call-station electric telephones in series on a metallic circuit that is connected to the other side of the relay-magnet, each telephone being normally shunted out of this circuit, a main-station talking-battery, an electric telephone operative on said circuit, a signal-transmitting mechanism at each call-station operative to make and break connection with the aforesaid circuit, and means whereby cutting in of a call-station telephone temporarily grounds the corresponding signaling mechanism to complete to the signal-circuit.

OTTO P. YURGAE.
ROBERT H. YURGAE.

In presence of—
H. G. UNDERWOOD,
H. F. BUTLER.